Oct. 30, 1923.

L. C. HOLLING 1,472,651

AUTOMOBILE COVER OR GARAGE

Filed Feb. 9, 1922     2 Sheets-Sheet 1

Inventor:
L. C. Holling.
By Geo. F. Kimmel
Attorney

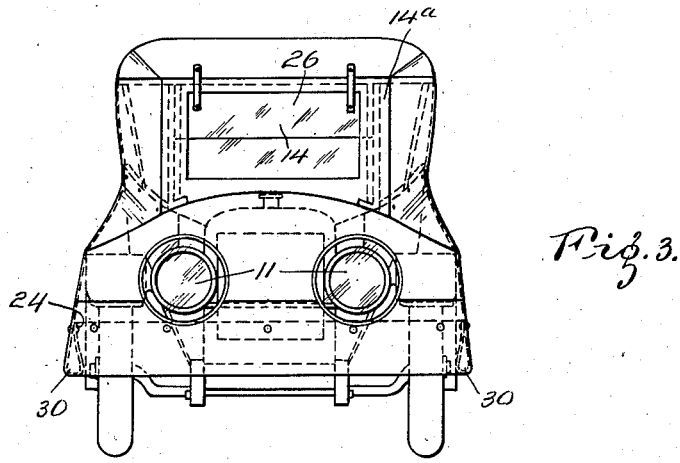
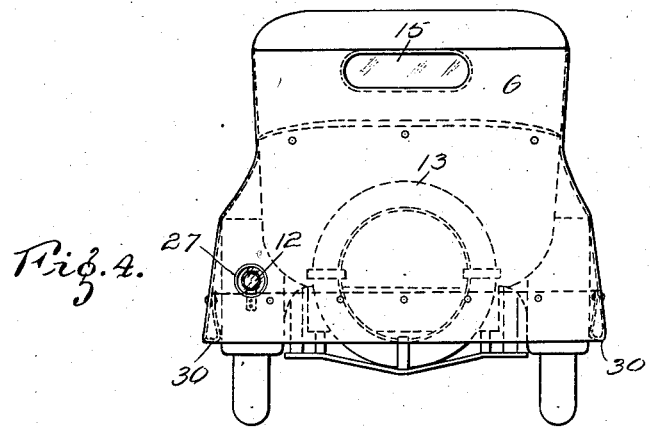

Patented Oct. 30, 1923.

1,472,651

UNITED STATES PATENT OFFICE.

LEWIS C. HOLLING, OF ST. LOUIS, MISSOURI.

AUTOMOBILE COVER OR GARAGE.

Application filed February 9, 1922. Serial No. 535,351.

*To all whom it may concern:*

Be it known that I, LEWIS C. HOLLING, a citizen of the United States, residing at St. Louis, in the State of Missouri, have invented certain new and useful Improvements in Automobile Covers or Garages, of which the following is a specification.

This invention has reference to automobile covers or garages and is designed to provide a cover substantially coextensive with the automobile, covering the vehicle top, sides, back, hood, and running gear down to a level below that of the vehicle axles, and enclosing the greater portion of the vehicle wheels, including the mud guards.

The invention is designed to provide a substantially complete cover or protection for the vehicle whereby the vehicle may be exposed to the elements without any harm to the finish of the vehicle, and, moreover, the occupants of the vehicle are protected from any harm or exposure while the vehicle is travelling.

Provision is made for sustaining the lower edge of the cover close to but out of engagement with the surface over which the vehicle is travelling and provision is also made for elevating and sustaining the lower edge of the cover at an intermediate and fully protecting height or at the full height of the top of the vehicle cover in such position that the cover may be very quickly dropped as the case requires and there fastened in the completely protecting position.

The cover is also equipped with the usual windows, and openings for the usual head and tail lights, and provision is made for covering and thereby protecting the customary spare tire, and by supplying a suitable number of snap fasteners access to and from the interior of the vehicle is had as desired without exposing the occupants of the vehicle to the effect of weather when the vehicle is travelling through a storm.

The invention is of a character making it feasible to contract the cover into small compass for fair weather travelling or expanded into substantially complete housing of the vehicle for use in inclement weather without in any manner interfering with the use of the vehicle in travelling or the storage of the vehicle out of doors when no garage is available and without subjecting the finish of the vehicle to the effects of the weather.

The invention will be best understood from a consideration of the following detailed description taken in connection with the accompanying drawings forming part of the specification, with the understanding however, that the invention is not confined to any strict conformity with the showing of the drawings, but may be changed and modified so long as such changes and modifications mark no material departure from the salient features of the invention as expressed in the appended claims.

In the drawings:—

Fig. 3 is a front elevation of the automobile with the protecting cover in partially elevated position but in the main protecting the automobile.

Fig. 4 is a view similar to Fig. 3, but of the rear end of the protected automobile.

Figure 1:
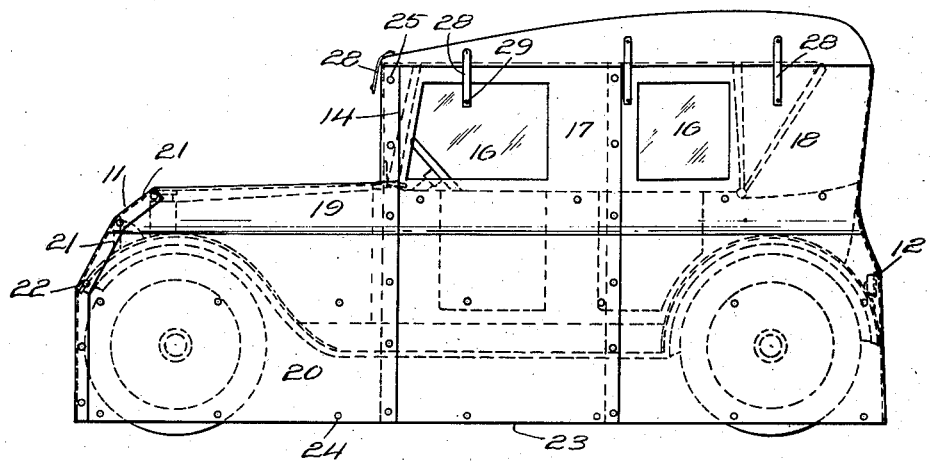
Figure 1 is a side elevation of an automobile fully enclosed and protected by the cover forming the subject of the invention.
Figure 2:
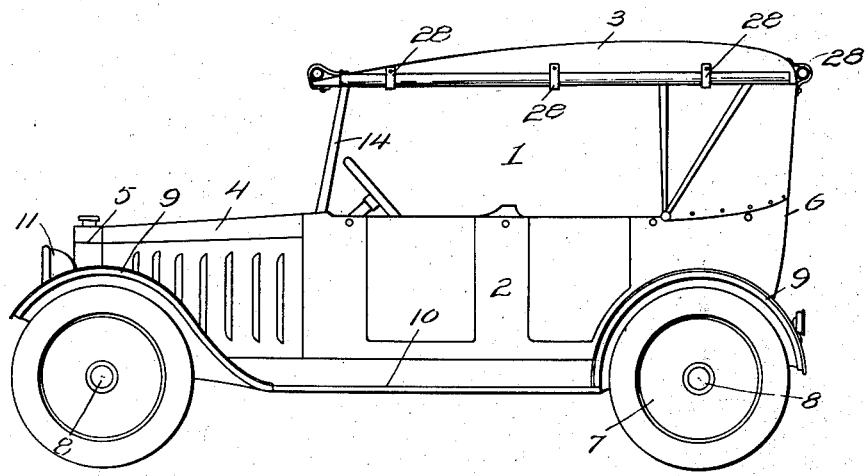
Fig. 2 is a view similar to Fig. 1, but showing the protecting cover fully collapsed or folded up.

Referring to the drawings, and particularly to Fig. 2, there is shown an automobile 1, which may be taken as typical of any form of automobile, provided with a body 2, a top 3, a hood 4, a front 5, including the radiator, and a back 6. The automobile also is provided with running gear indicated by wheels 7, axles 8, mud guards 9, and steps 10. The automobile is also shown as provided with head lights 11 and a tail light 12 as well as a spare tire 13 appearing in Fig. 4, while a wind shield 14 is shown in Figs. 1, 2 and 3, and a window 15 appears in the back 6 in Fig. 4, and head lights 11 are shown in Fig. 1.

Attached to the top 3 so as to hang therefrom are supplemental curtains 17 and 18 on opposite sides of the body of the vehicle, a cover member 19 of a length to project forwardly over the hood 14 and crosswise over the fenders 9 and drop on either side below the axles 8 to a point close to but terminating shortly above the ground. The cover member 19 also includes a downward extension 20 on both sides of the hood, while the cover 19 and 20 where connected over the radiator 5 may be provided with heavy canvas water strips 21 having junction snap buttons 22 where joining in order that these parts of the cover may be readily connected and disconnected as needed.

The curtains 17, 18 and 20 all drop to the same extent when fully extended so that the bottom edge of these curtains reach close to the ground except when such bottom edge 23 is returned upon itself and is held in an appropriately elevated position by snap buttons 24, said edge 23 being then appropriately raised on the inner surface of the cover but still below the level of the axles and the steps 10.

The forward edge of the curtain or cover 17 is connected to a front cover 14ª by means of snap buttons 25 permitting the separation of the cover at the buttons 25 as may be desired and the front cover 14ª may be provided with a window 26 through which a forward view may be had by way of the wind shield 14.

The cover member 6 is expanded laterally and drops to a sufficient extent to cover the rear of the vehicle to the level of the edge 23 of the cover and enclose the spare tire 13. Moreover the rear cover member 6 at an appropriate level has an opening 27 to expose the tail light 12 without interference with said light.

About the top 3 of the vehicle wherever it is desired to sustain the cover member in the elevated position out of the way, there are provided straps 28 adapted to snap buttons 29 so that the cover members may be held in the raised position when desired or may be released or allowed to fall to the lowermost position, or to the partially looped position indicated at 30 in Figs. 3 and 4.

The supplemental cover while particularly intended for the larger types of automobiles, may be used on smaller types of automobiles and may be used indifferently in either fair weather or foul weather.

The supplemental cover is also useful for cold weather or it constitutes a useful cover in windy weather affording material protection from the effects of cold.

The supplementary cover is susceptible of attachment without any material change whatever in the automobile and without effect upon the ordinary equipment of the automobile and without necessitating the purchase of any additional equipment.

Furthermore, the supplementary cover is easily applied and may be installed without any material expense.

Furthermore, the cost of the supplementary cover and its installation represents but a small part of the saving in the finish of the automobile and the cost is soon covered in the saving effected in the refinishing of the vehicle.

What is claimed is:—

1. A supplementary automobile cover comprising side, front and rear cover members mounted exteriorly to the normal curtain installation of the vehicle and of a length to extend to a level below the axle and running boards of the vehicle to house or cover the exterior of the vehicle and its curtains, means for suspending said members at their upper ends from the top of the vehicle, said front cover member having openings for the headlights and windshield of the vehicle, said rear cover member having an opening for the rear window of the vehicle and an opening for the tail light of the vehicle, and means for detachably connecting said cover members together to maintain them in housing position with respect to the vehicle.

2. A supplementary automobile cover comprising side, front and rear cover members mounted exteriorly to the normal curtain installation of the vehicle and of a length to extend to a level below the axle and running boards of the vehicle to house or cover the exterior of the vehicle and its curtains, means for suspending said members at their upper ends from the top of the vehicle, said front cover member having openings for the headlights and windshield of the vehicle, said rear cover member having an opening for the rear window of the vehicle and an opening for the tail light of the vehicle, and means for detachably connecting said cover members together to maintain them in housing position with respect to the vehicle, and each of said side cover members formed of a plurality of sections having means for detachably connecting them together when the side members are in housing position with respect to the vehicle.

3. A supplementary automobile cover comprising side, front and rear cover members mounted exteriorly to the normal curtain installation of the vehicle and of a length to extend to a level below the axle and running boards of the vehicle to house or cover the exterior of the vehicle and its curtains, means for suspending said members at their upper ends from the top of the vehicle, said front cover member having openings for the headlights and windshield of the vehicle, said rear cover member having an opening for the rear window of the vehicle and an opening for the tail light of the vehicle, and means for detachably connecting said cover members together to maintain them in housing position with respect to the vehicle, and each of said side cover members formed of a plurality of sections having means for detachably connecting them together when the side members are in housing position with respect to the vehicle, and said front cover member including a pair of extensions and means for detachably connecting them in position when arranged to house a portion of the vehicle.

In testimony whereof I affix my signature hereto.

LEWIS C. $\overset{\text{his}}{\times}$ HOLLING.
mark

Witnesses:
 FRANK ORFF,
 N. K. ROLLY.